United States Patent Office 2,809,809
Patented Oct. 15, 1957

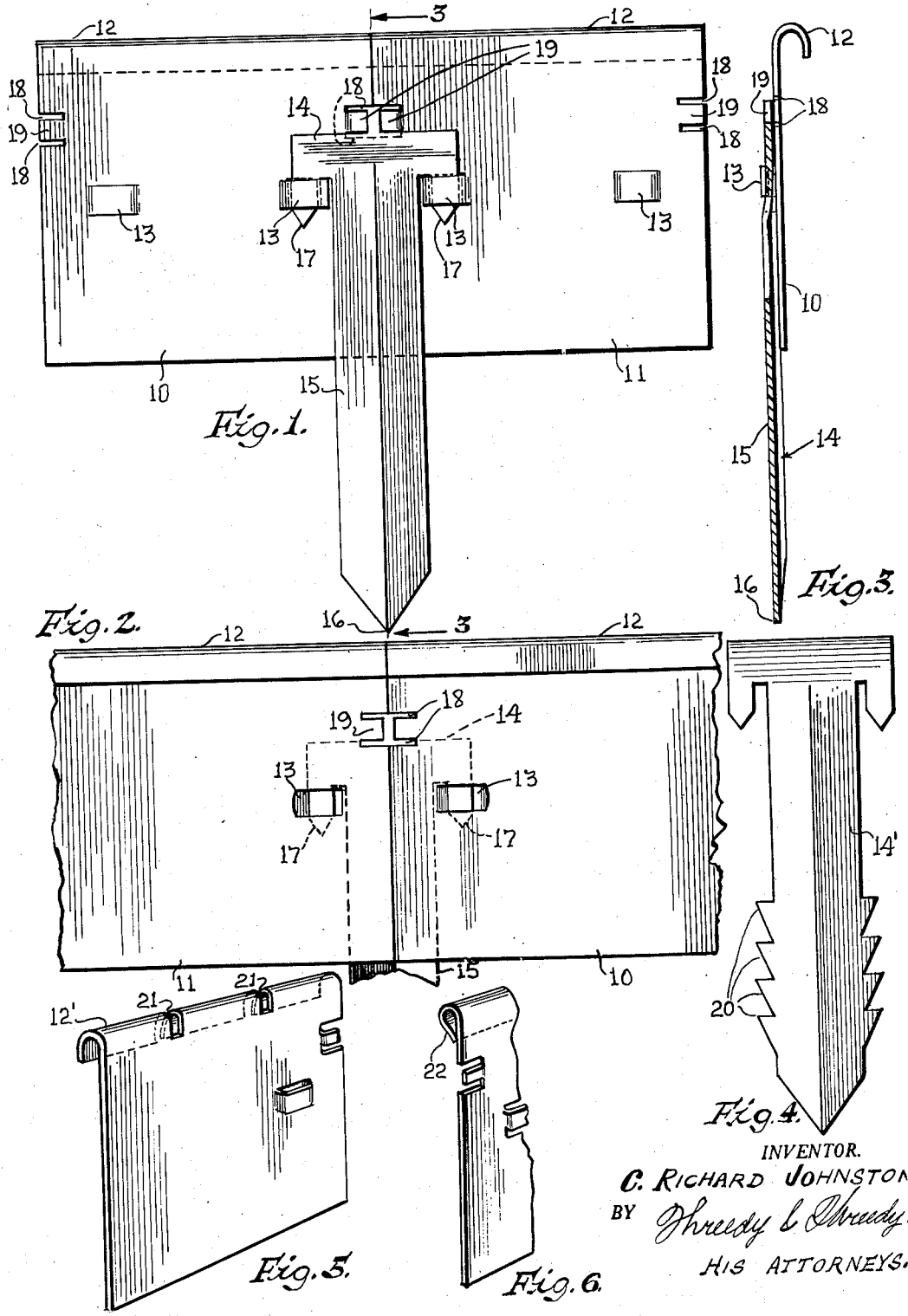

2,809,809

LAWN EDGER

Charles Richard Johnston, Chicago, Ill., assignor to Transportation Specialties Co., Chicago, Ill., a corporation of Illinois Application April 27, 1956, Serial No. 581,036

10 Claims. (Cl. 256—21)

This invention relates to new and useful improvements in a law edger of the type used to define walks, flower beds, driveways, or the like.

The principal object of my invention is in the provision of a device of this character of a construction which is simple in operation and positive in its connecting and securing action.

Another important object of my invention is in the provision in a device of this character of a ground stake and its method of attaching together separate pieces of edging material.

Yet another and equally important object of my invention is the provision of a device of this character comprising edging material formed so that it may be readily curved or bent to meet the requirements of any use to which it may be put.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a rear elevational view of my edger together with its connecting ground stake;

Fig. 2 is a front elevational view of my edger showing the connecting ground stake in dotted lines;

Fig. 3 is a longitudinal sectional view taken on line 3—3 of Fig. 1;

Fig. 4 is an elevational view of a modified form of connecting ground stake;

Fig. 5 is a rear perspective view of my edging material having its lip slotted for ease in forming the same in a curve;

Fig. 6 is a fragmentary elevational view showing the edging material in a modified form, with the lip thereof crimped closed.

Strips of metal comprising my edging material are shown at 10 and 11. This material has its top edge formed into a soft curve 12 as shown in Fig. 3. Each piece of material 10 and 11 has formed near its upright edge a laterally extending stirrup 13. These stirrups 13 are formed in the same horizontal plane in each piece of material, on both ends thereof, as shown in Fig. 1.

For the purpose of illustration, the strips of material are shown in shorter lengths than they normally would be. However, the strips would be made available in various lengths so that through a combination thereof, any length of edging may be achieved.

A ground stake 14 in the form of a T has an elongated stem 15 which terminates into a penetrating point 16. The cross arms of the T are provided at their ends with latch points 17 extending in spaced parallel relation to the stem 15. The latch points 17 are adapted to be inserted in the stirrups 13 on each end of the strips of material when such strips are placed with their vertical edges in confronting relation as shown in Figs. 1 and 2. Cut in the vertical edges of each strip of material 10 and 11 above and in spaced relation with respect to the plane of the stirrup 13 are two spaced parallel slots 18. The portion of the material 19 between these slots 18 is adapted to be bent so as to engage the top edge of the stake 14 and thereby serve as a locking finger. In such position the stake 14 is locked by this locking finger 19 with the latch points inserted in the stirrups 13 and the stake is thus arrested from upward movement with respect to the stirrups so as to prevent disconnection of the stake when the penetrating point 16 is inserted into the ground.

The ground stake 14 is formed so that the major portion of the stem 15 is angled in cross section, for facilitating insertion of the stake into the ground. Such angle is shown in Fig. 3.

Fig. 4 shows a modified form of my ground and connecting stake 14' having barbs 20 formed thereon to assist in anchoring the edging to the ground.

In Fig. 5 I disclose my edging material as having formed in the curved top edge 12' thereof a series of cut-out portions 21. With the portions 21 cut out, the edging material may be curved to form or fit any necessary pattern, being particularly adaptable to edging flower beds, curving walks and the like.

In Fig. 6 I show a crimped top edge 22 bent back upon itself to form a closed lip, which form is particularly adaptable for edging walks and driveways.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A device of the character described comprising strips of material having their upper longitudinal edges formed to provide a downwardly extending lip, a ground stake for anchoring said strips to the ground, said stake having an enlarged head portion with said head portion providing depending latch points spaced from and extending parallelly with respect to said stake, means formed in said strips for receiving said latch points for connecting said strips together in a horizontal plane, and means formed in the vertical edges of each of said strips for locking said stake to said strips in its connecting position.

2. A lawn edger comprising strips of material having their upper longitudinal edges formed to provide a downwardly extending lip, a ground stake for anchoring said strips to the ground in a vertical position, said stake having an enlarged head portion with said head portion providing depending latch points spaced from and extending parallelly with respect to said stake, means formed in said strips and cooperating with said latch points for connecting in abutting relation certain vertical edges of said strips, and means formed in each of said abutting edges of said strips cooperating to lock said stake to said strips in its connecting position.

3. A lawn edger comprising strips of material having their upper longitudinal edges formed to provide a downwardly extending lip, means provided by said lip for permitting the curving of the material through a vertical plane, a ground stake for anchoring said strips to the ground in a vertical position, said stake having an enlarged head portion with said head portion providing depending latch points spaced from and extending parallelly with respect to said stake, means on said strips and cooperating with said latch points for connecting in abutting relation certain vertical edges of said strips, and means formed in each of said abutting edges of said strips cooperating to lock said stake to said strips in its connecting position.

4. A lawn edger comprising strips of material having their upper longitudinal edges formed to provide a downwardly extending lip, a ground stake for anchoring said strips to the ground in vertical position, said stake having an enlarged head portion with said head portion providing depending latch points spaced from and extending parallelly with respect to said stake, means on said stake for preventing movement of said stake in one direction with respect to the ground after it has anchored said strips to the ground, means formed in said strips and cooperating with said latch points for connecting in abutting relation certain vertical edges of said strips, and means formed in the abutting edges of said strips cooperating to lock said stake to said strips in its connecting position.

5. A lawn edger comprising strips of material having their upper longitudinal edges formed to provide a downwardly extending lip, a ground stake for anchoring said strips to the ground in a vertical position, said stake having an enlarged head portion with said head portion providing depending latch points spaced from and extending parallelly with respect to said stake, laterally extending stirrups formed in each of said strips adjacent the edges thereof for frictionally receiving said latch points to connect in abutting relation certain vertical edges of said strips to form said strips into a continuous strip of material, and means formed in each of the abutting edges of said strips cooperating to lock said stake in said stirrups to said strips in its connecting position.

6. A lawn edger comprising strips of material having their upper longitudinal edges formed to provide a downwardly extending lip, a ground stake for anchoring said strips to the ground in a vertical position, said stake having an enlarged head portion with said head portion providing depending latch points spaced from and extending parallelly with respect to said stake, means formed in the vertical edges of each of said strips and cooperating with said latch points for connecting in abutting relation said vertical edges of said strips, laterally extending fingers formed in the abutting edges of said strips in confronting relation to each other and engageable with said head of said stake to lock said stake to said strips in its connecting position.

7. A lawn edger comprising strips of material having their upper longitudinal edges formed to provide a downwardly extending lip, means provided by said lip for permitting the curving of the strips through a vertical plane, a ground stake for anchoring said strips to the ground in a vertical position, said stake having an enlarged head portion with said head portion providing depending latch points spaced from and extending parallelly with respect to said stake, means on said stake for preventing movement of said stake in one direction with respect to the ground after it has anchored said strips to the ground, means formed in the vertical edges of each of said strips and cooperating with said latch points for connecting in abutting relation said vertical edges of said strips, and means formed in each of the abutting edges of said strips cooperating to lock said stake to said strips in its connecting position.

8. A lawn edger comprising strips of material having their upper longitudinal edges formed to provide a downwardly extending lip, a ground stake for anchoring said strips to the ground in a vertical position, said stake having an enlarged head portion with said head portion providing depending latch points spaced from and extending parallelly with respect to said stake, laterally extending stirrups formed in each of said strips for frictionally receiving said latch points to connect in abutting relation certain vertical edges of said strips to form said strips into a continuous strip of material, laterally extending fingers formed in the abutting edges of said strips in confronting relation to each other and engageable with said head of said stake to lock said stake in said stirrups to said strips in its connecting position.

9. A device of the class described comprising strips of material having their upper longitudinal edges formed to provide a downwardly extending lip, means provided by said lip for permitting the curving of said strips through a vertical plane, a ground stake for anchoring said strips adjacent the edges thereof to the ground in a vertical position, said stake having an enlarged head portion with said head portion providing depending latch points spaced from and extending parallelly with respect to said stake, means on said stake for preventing movement of said stake in one direction with respect to the ground after it has anchored said strips to the ground, laterally extending stirrups formed in each of said strips adjacent the edges thereof for frictionally receiving said latch points to connect in abutting relation certain vertical edges of said strips to form said strips into a continuous strip of material, laterally extending fingers formed in the abutting edges of said strips in confronting relation to each other and engageable with said head of said stake to lock said stake in said stirrups to said strips in its connecting position.

10. A device of the class described comprising strips of material having their upper longitudinal edges formed to provide a downwardly extending lip, said lip having formed therein spaced apart slots for permitting the curving of said strips through a vertical plane, a ground stake for anchoring said strips to the ground in a vertical position, said stake having an enlarged head portion with said head portion providing depending latch points spaced from and extending parallelly with respect to said stake, barbs formed on said stake for preventing movement of said stake in one direction with respect to the ground after it has anchored said strips to the ground, laterally extending stirrups formed in each of said strips adjacent the edges thereof for frictionally receiving said latch points to connect in abutting relation certain vertical edges of said strips to form said strips into a continuous strip of material, laterally extending fingers formed in the abutting edges of said strips in confronting relation to each other and engageable with said head of said stake to lock said stake in said stirrups to said strips in its connecting position.

References Cited in the file of this patent
UNITED STATES PATENTS

| | | |
|---|---|---|
| 427,815 | Wolf | May 13, 1890 |
| 603,938 | Brock | May 10, 1898 |
| 2,622,848 | Campbell | Dec. 23, 1952 |